United States Patent
No et al.

(10) Patent No.: US 11,528,125 B2
(45) Date of Patent: Dec. 13, 2022

(54) ELECTRONIC DEVICE FOR SORTING HOMOMORPHIC CIPHERTEXT USING SHELL SORTING AND OPERATING METHOD THEREOF

(71) Applicants: Seoul National University R&DB Foundation, Seoul (KR); Industry-Academic Cooperation Foundation, Chosun University, Gwangju (KR)

(72) Inventors: Jong Seon No, Seoul (KR); Young Sik Kim, Gwangju (KR); Joon Woo Lee, Seoul (KR)

(73) Assignees: Seoul National University R&DB Foundation, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 100 days.

(21) Appl. No.: 17/320,181

(22) Filed: May 13, 2021

(65) Prior Publication Data
US 2021/0376998 A1    Dec. 2, 2021

(30) Foreign Application Priority Data
May 29, 2020   (KR) ........................ 10-2020-0064744

(51) Int. Cl.
*H04L 9/00*    (2022.01)
*H04L 9/08*    (2006.01)
*H04L 9/06*    (2006.01)
*G06F 16/31*   (2019.01)

(52) U.S. Cl.
CPC ............ *H04L 9/008* (2013.01); *G06F 16/319* (2019.01); *H04L 9/0618* (2013.01); *H04L 9/0869* (2013.01)

(58) Field of Classification Search
CPC ..... H04L 9/008; H04L 9/0618; H04L 9/0869; H04L 2209/046; H04L 9/00; H04L 9/08; H04L 9/06; G06F 16/319; G06F 17/10; G06F 16/31
See application file for complete search history.

(56) References Cited

U.S. PATENT DOCUMENTS

| 10,560,257 B2 | 2/2020 | Hoffstein et al. |
| 2006/0015945 A1* | 1/2006 | Fields ................. G06F 21/6209 726/27 |
| 2019/0034646 A1* | 1/2019 | Fujiwara ................. G06F 21/62 |

FOREIGN PATENT DOCUMENTS

| KR | 10-1829267 B1 | 2/2018 |
| KR | 10-2040120 B1 | 11/2019 |

OTHER PUBLICATIONS

Ayantika Chatterjee, et al., "Sorting of Fully Homomorphic Encrypted Cloud Data: Can Partitioning be effective?", IEEE Transactions on Services Computing, Oct. 11, 2017, http://dx.doi.org/10.1109/TSC.2017.2711018, 15 pages.

(Continued)

*Primary Examiner* — Quazi Farooqui
(74) *Attorney, Agent, or Firm* — Park, Kim & Suh, LLC (57) ABSTRACT

Provided are an electronic device for sorting homomorphic ciphertext by using shell sorting and an operating method thereof to sort ciphertext generated by using homomorphic encryption according to a size of an original number corresponding thereto.

11 Claims, 4 Drawing Sheets

(56) References Cited

OTHER PUBLICATIONS

Irmantas Radavičius, et al., "An empirical study of the gap sequences for Shell sort", Lietuvos matematikos rinkinys, Proc. of the Lithuanian Mathematical Society, Ser.A, vol. 54, 2013, 61-66, 6 pages.
Tao Jiang, et al., "Average-Case Complexity of Shellsort", Jan. 20, 1999, arXiv:cs/9901010v1 [cs.DS], 11 pages.

* cited by examiner

ELECTRONIC DEVICE FOR SORTING HOMOMORPHIC CIPHERTEXT USING SHELL SORTING AND OPERATING METHOD THEREOF

CROSS-REFERENCE TO RELATED APPLICATIONS

This application claims priority to and the benefit of Korean Patent Application No. 10-2020-0064744 filed in the Korean Intellectual Property Office on May 29, 2020, the entire contents of which are incorporated herein by reference.

TECHNICAL FIELD

The present invention relates to an electronic device for sorting homomorphic ciphertext using shell sorting and an operating method thereof.

BACKGROUND ART

In recent years, as various types of information is generated and circulated, damage such as exposure of important information to a third party is caused due to hacking or transmission of information to an incorrect path.

In particular, when in the state where no defense mechanism is applied to the important information such as military information or personal information during a process of transferring information, the important information is accidentally transmitted to the third party, the third party can easily access the important information, thereby causing great damage. As described above, in order to prevent the important information from being exposed, advanced encryption technology is required.

In recent years, the interest of technology related to homomorphic encryption has been increasing. The homomorphic encryption means encryption technology that can compute encrypted data without decryption. In other words, the homomorphic encryption means encryption technology that allows the same value as a result of computing data in a plaintext state to be obtained when a computed result value in an encrypted state is decrypted.

For example, it is assumed that there are plaintext data called A and B, and the encrypted data generated by homomorphic encryption of A is $E_A$ and encrypted data generated by homomorphic encryption of B is $E_B$. In this case, when it is assumed that an operation value called $E_S$ is calculated by performing a predetermined operation for EA and $E_B$, if $E_S$ is decrypted, making the decryption value be equal to a value acquired by adding or multiplying A and B is a basic concept of the homomorphic encryption. In other words, when a value calculated by performing the predetermined operation for two encryption data in an encryption domain is decrypted, encryption that makes the decryption value be equal to a value acquired by adding or multiplying two plaintext data in a plaintext domain is referred to as homomorphic encryption.

In a computing system, technology that sorts data is importantly utilized. When it is assumed that there is an array constituted by predetermined numbers, a method such as insertion sorting or shell sorting is used a lot as a method for sorting the corresponding numbers in an ascending order.

Here, the shell sorting as an algorithm for quickly sorting the array is an algorithm that creates partial lists for the array by sequentially using gaps constituting a predetermined gap sequence and performs the insertion sorting for each partial list to sort the array. Since the shell sorting creates the partial list for each gap instead of performing the insertion sorting for the entire array as it is and performs the insertion sorting only for each partial list, the shell sorting is advantageous of being comparatively fast.

In that sorting data is importantly utilized in the computing system as described above, a research into a method for sorting encrypted number data according to a size of an original number even in encryption is required.

For example, when it is assumed that there is original data constituted by 10 numbers, if 10 encrypted numbers are generated, which correspond to 10 original numbers, a research into a method for sorting 10 encrypted numbers in ascending order according to the size of 10 original numbers is required. If 10 encrypted numbers are sorted according to the sizes of 10 original numbers as described above, when 10 encrypted number arrays after being sorted are decrypted, an array is calculated in which 10 original numbers are sorted in ascending order.

In this regard, in the shell sorting, the insertion sorting is performed for each partial list, and in the insertion sorting, a method is used, in which two numbers are compared to move a minimum value (small number) to a front end of the array and a maximum value (large number) to a rear end of the array. When it is assumed that the shell sorting is used to sort 10 encrypted numbers in ascending order according to the sizes of 10 original numbers, there is a need that the insertion sorting should be performed for two encrypted numbers according to the sizes of two original numbers corresponding thereto while performing the shell sorting.

If a decryption value of a value calculated by performing a predetermined first operation for the two encrypted numbers is equal to the maximum value of the two original numbers, and a decryption value of a value calculated by performing a predetermined second operation for the two encrypted numbers is equal to the minimum value of the two original numbers, the value calculated through the first operation is disposed on the rear end of the array of the encryption number and the value calculated through the second operation is disposed on the front end of the array of the encrypted number to insertion-sort the two encrypted numbers according to the sizes of the two original numbers corresponding thereto.

As described above, since encryption which allows the decryption value for an operation result in the encrypted domain to be equal to an operation result in the plaintext domain is the homomorphic encryption, when the homomorphic encryption is used, an operation of sorting the encrypted number according to the size of the original number corresponding thereto will be able to be performed.

Therefore, a research into technology which can allow a ciphertext generated by using the homomorphic encryption to be sorted according to the size of the original number corresponding thereto is required. In particular, a research into technology which can allow the ciphertext to be more quickly sorted by using the shell sorting is required.

SUMMARY OF THE INVENTION

The present invention has been made in an effort to present an electronic device for sorting homomorphic ciphertext by using shell sorting and an operating method thereof to sort ciphertext generated by using homomorphic encryption according to a size of an original number corresponding thereto.

An exemplary embodiment of the present invention provides an electronic device for sorting homomorphic ciphertext using shell sorting, which includes: an encryption data storage unit storing an array constituted by a plurality of encryption numbers, each of the plurality of encryption numbers being a number generated through homomorphic encryption of each of a plurality of original numbers; a gap sequence storage unit storing a preset gap sequence for shell sorting; and a shell sorting performing unit performing the shell sorting for the array by using each gap in descending order for the gaps constituting the gap sequence, in which the shell sorting performing unit includes a partial list generating unit generating, when the partial list generating unit performs the shell sorting for the array by using an n (n is a natural number)-th gap among the gaps constituting the gap sequence, a partial list according to the n-th gap from the array in which the shell sorting is completed by using an n−1-th gap, when n is 1, the array stored in the encryption data storage unit in an initial state being used, a partial list sorting unit sorting the partial lists by performing insertion sorting of each of the partial lists based on sizes of original numbers corresponding to encryption numbers constituting each partial list, and a sorting completion processing unit combining, when sorting the partial lists is completed, the partial lists of which sorting is completed to generate the array in which the shell sorting is completed using the n-th gap.

Another exemplary embodiment of the present invention provides an operating method of an electronic device for sorting homomorphic ciphertext using shell sorting, which includes: maintaining an encryption data storage unit storing an array constituted by a plurality of encryption numbers, each of the plurality of encryption numbers being a number generated through homomorphic encryption of each of a plurality of original numbers; maintaining a gap sequence storage unit storing a preset gap sequence for shell sorting; and performing the shell sorting for the array by using each gap in descending order for the gaps constituting the gap sequence, in which the performing of the shell sorting includes generating, when performing the shell sorting for the array by using an n (n is a natural number)-th gap among the gaps constituting the gap sequence, a partial list according to the n-th gap from the array in which the shell sorting is completed by using an n−1-th gap, when n is 1, the array stored in the encryption data storage unit in an initial state being used, sorting the partial lists by performing insertion sorting of each of the partial lists based on sizes of original numbers corresponding to encryption numbers constituting each partial list, and combining, when sorting the partial lists is completed, the partial lists of which sorting is completed to generate the array in which the shell sorting is completed using the n-th gap.

According to an exemplary embodiment of the present invention, an electronic device for sorting homomorphic ciphertext by using shell sorting and an operating method thereof are presented to support to sort ciphertext generated by using homomorphic encryption according to a size of an original number corresponding thereto.

DETAILED DESCRIPTION

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

Figure 1:
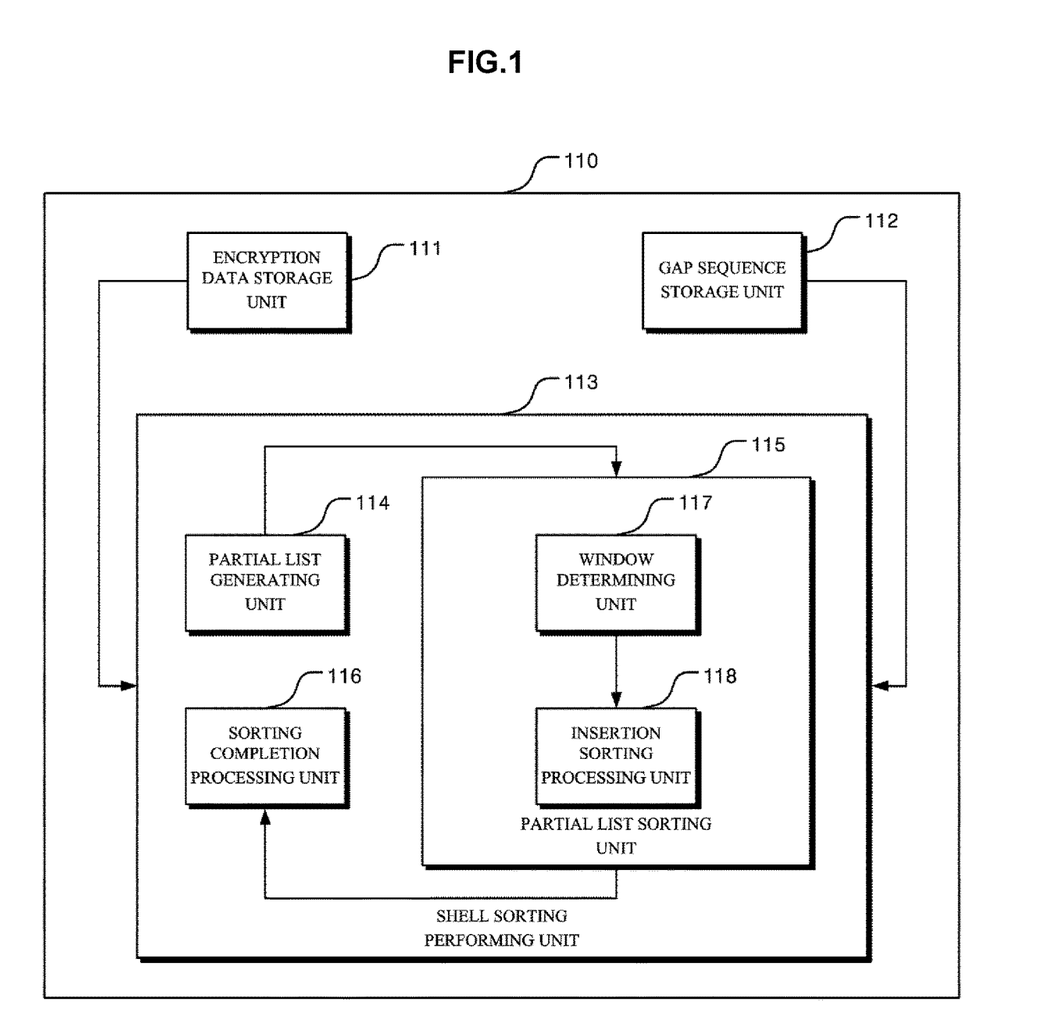
FIG. 1 is a diagram illustrating a structure of an electronic device for sorting homomorphic ciphertext using shell sorting according to an exemplary embodiment of the present invention.

FIG. 1 is a diagram illustrating a structure of an electronic device for sorting homomorphic ciphertext using shell sorting according to an exemplary embodiment of the present invention.

Referring to FIG. 1, the electronic device 110 according to the present invention includes an encryption data storage unit 111, a gap sequence storage unit 112, and a shell sorting performing unit 113.

The encryption data storage unit 111 stores an array constituted by a plurality of encryption numbers.

Here, each of the plurality of encryption numbers is a number generated by homomorphic encryption of each of a plurality of original numbers.

The gap sequence storage unit 112 stores a preset gap sequence for shell sorting. For example, the gap sequence means a sequence constituted by gaps such as '121, 91, 51, . . . '.

The shell sorting performing unit 113 performs the shell sorting for the array by using each gap in descending order for the gaps constituting the gap sequence.

For example, if the gap sequence is constituted by '121, 91, 51, . . . ', the shell sorting performing unit 113 may perform the shell sorting for the array by using each gap in the order of '121, 91, 51, . . . '.

In this case, the shell sorting performing unit 113 as a specific component for performing the shell sorting for the array by using each gap constituting the gap sequence may include a partial list generating unit 114, a partial list sorting unit 115, and a sort completion processing unit 116.

When the partial list generating unit 114 performs the shell sorting for the array by using an n (n is a natural number)-th gap among the gaps constituting the gap sequence, the partial list generating unit 114 generates a partial list according to the n-th gap from the array in which the shell sorting is completed by using an n−1-th gap.

In this case, if n is 1, the partial list generating unit 114 may generate partial lists according to a first gap from the array stored in the encryption data storage unit 111 in an initial state.

The partial list sorting unit 115 may sort the partial lists by performing insertion sorting of each of the partial lists based on sizes of original numbers corresponding to encryption numbers constituting each partial list.

When sorting the partial lists is completed, the sorting completion processing unit 116 combines the partial lists of which sorting is completed to generate the array in which the shell sorting is completed using the n-th gap.

In this case, according to an embodiment of the present invention, in order to perform the insertion sorting for each of the partial lists, when insertion sorting through a comparison between a first encryption number and a second encryption number which are any two encryption numbers in each partial list is performed, the partial list sorting unit 115 processes the insertion sorting between the first encryption number and the second encryption number by a method of calculating a third encryption number by performing an operation by applying the first encryption number and the second encryption number to a predetermined first homomorphic operation equation corresponding to a first operation equation for calculating a maximum value between a first original number corresponding to the first encryption number and a second original number corresponding to the second encryption number, calculating a fourth encryption number by performing the operation by applying the first encryption number and the second encryption number to a predetermined second homomorphic operation corresponding to a second operation equation for calculating a minimum value between the first original number and the second original number, and then inputting the fourth encryption number into a place where the first encryption number is located on the partial list and inputting the third encryption number into a place where the second encryption number is located on the partial list to perform the insertion sorting for each of the partial lists.

In this case, according to an embodiment of the present invention, the first homomorphic operation equation may be an operation equation expressed by Equation 1 below and the second homomorphic operation equation may be an operation equation expressed by Equation 2 below.

$$\text{MAX} = \{0.5 \otimes (a \oplus b)\} \oplus \{0.5 \otimes \sqrt{(a \ominus b)^2}\} \quad \text{[Equation 1]}$$

$$\text{MIN} = a \oplus b \ominus \text{MAX} \quad \text{[Equation 2]}$$

Here, $\otimes$ denotes an equation corresponding to a multiplication in a plaintext domain as a homomorphic multiplication performed in an encryption domain, $\oplus$ denotes an equation corresponding to an addition in the plaintext domain as a homomorphic addition performed in the encryption domain, and $\ominus$ denotes an equation corresponding to a subtraction in the plaintext domain as a homomorphic subtraction performed in the encryption domain. The method for calculating the first homomorphic operation equation and the second homomorphic operation equation is introduced in detail in "J. H. Cheon, D. Kim, D. Kim, H. H. Lee, and K. Lee, 'Numerical methods for comparison on homomorphically encrypted numbers', Cryptology ePrint Archive, Report 2019/417, 2019." which is a prior art document.

In this regard, the partial list sorting unit 115 may calculate a third encryption number called MAX by applying the first encryption number to a and applying the second encryption number to b in Equation 1 above and calculate a fourth encryption number called MIN by applying the first encryption number to a, applying the second encryption number to b, and applying the third encryption number computed in Equation 1 above to MAX in Equation 2 above.

According to an embodiment of the present invention, the partial list sorting unit 115 may include a window determining unit 117 and an insertion sorting processing unit 118.

The window determining unit 117 determines a window length to be insertion-sorted based on a length of each of the partial lists.

When the insertion sorting processing unit 118 performs the insertion sorting in each of the partial lists, the insertion sorting processing unit 118 performs the insertion sorting only for a partial array corresponding to the window length based on an encryption number which becomes a target of the insertion sorting.

In this case, according to an embodiment of the present invention, the window determining unit 117 may determine the window length based on Equation 3 below.

$$k = \min(\lceil \sqrt{l_S \cdot \alpha} \rceil, l_S) \quad \text{[Equation 3]}$$

Here, k denotes the window length, $l_S$ denotes the length of each partial list, $\alpha$ denotes a preset constant, $\lceil \ \rceil$ and denotes a ceiling function.

Hereinafter, an operation of the electronic device 110 according to the present invention will be described in detail as an example with reference to the diagram illustrated in FIG. 2.

First, it is assumed that an array constituted by a plurality of encryption numbers stored in the encryption data storage unit 111 is 'e1, e2, e3, e4, e5, e6, e7, e8, e9, e10, and e11' (210) represented by reference numeral 210. In this case, it is assumed that each encryption number constituting the array called 'e1, e2, e3, e4, e5, e6, e7, e8, e9, e10, and e11' (210) is a number generated through homomorphic encryption of an original number such as '10, 7, 5, 4, 2, 3, 1, 6, 8, 9, and 11' as illustrated in FIG. 2.

In this case, the operation of the shell sorting performing unit 113 after assuming that a first gap among the gaps constituting the gap sequence stored in the gap sequence storage unit 112 is '3' is described below.

First, since the gap '3' is a the first gap, the partial list generating unit 114 may generate three partial lists 221, 222, and 223 according to the gap "3" from the array 'e1, e2, e3, e4, e5, e6, e7, e8, e9, e10, and e11' (210) stored in the encryption data storage unit 111.

Figure 2:
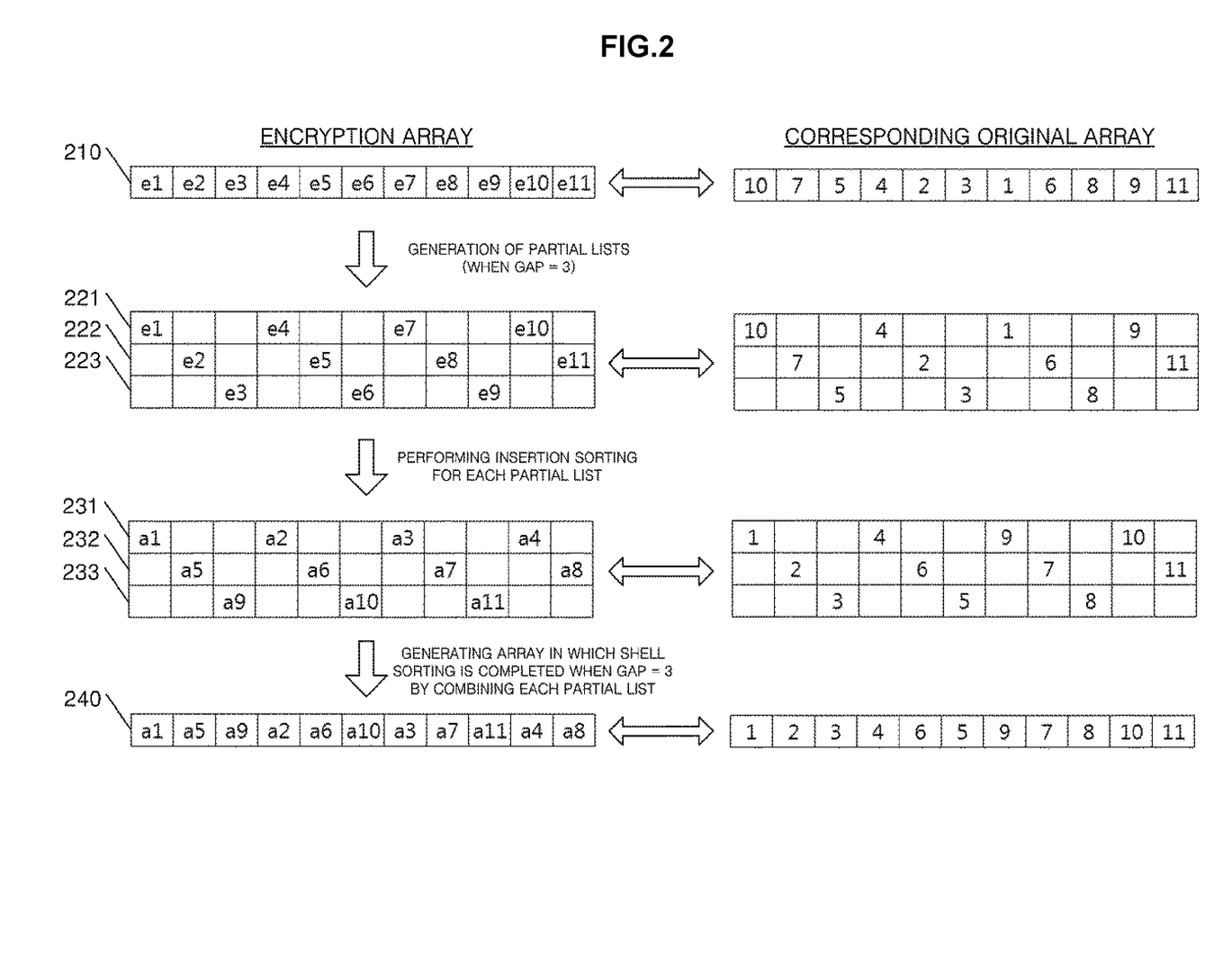
FIGS. 2 and 3 are diagrams illustrating an operation of an electronic device for sorting homomorphic ciphertext using shell sorting according to an exemplary embodiment of the present invention.

In this case, an original partial list in the plaintext corresponding to each of three partial lists 221, 222, and 223 may be represented in the form of a 'corresponding original array' shown on the right side of FIG. 2.

When three partial lists 221, 222, and 223 are generated as described above, the partial list sorting unit 115 may perform the insertion sorting for each of three partial lists 221, 222, and 223 based on the sizes of the original numbers corresponding to the encryption numbers constituting each partial list.

In other words, the partial list sorting unit 115 may perform the insertion sorting for 'e1, e4, e7, and e10' constituting partial list 1 221 based on sizes of '10, 4, 1, 9' which are original numbers corresponding thereto, perform the insertion sorting for 'e2, e5, e8, and e11' constituting partial list 2 222 based on sizes of '7, 2, 6, and 11' which are original numbers corresponding thereto, and perform the insertion sorting for 'e3, e6, and e9' constituting partial list 3 223 based on sizes of '5, 3, and 8' which are original numbers corresponding thereto.

Specifically, the partial list sorting unit 115 may perform the insertion sorting based on each of 'e4', 'e7', and 'e10' in partial list 1 221, and first, the partial list sorting unit 115 may calculate a predetermined operation value by applying 'e4' and 'e1' to the first homomorphic operation equation according to Equation 1 above and the second homomorphic operation equation according to Equation 2 above as inputs in order to perform the insertion sorting based on 'e4'.

Here, since the first homomorphic operation equation is a homomorphic operation equation corresponding to the first operation equation for calculating the maximum value of two original numbers, a decryption value for a result value calculated by applying 'e4' and 'e1' to the first homomorphic operation equation as the inputs becomes the same value as '10' which is the maximum value of '4' which is the original number corresponding to 'e4' and '10' which is the original number corresponding to 'e1'.

Since the second homomorphic operation equation is a homomorphic operation equation corresponding to the second operation equation for calculating the minimum value of two original numbers, a decryption value for a result value calculated by applying 'e4' and 'e1' to the second homomorphic operation equation as the inputs becomes the same value as '4' which is the minimum value of '4' which is the original number corresponding to 'e4' and '10' which is the original number corresponding to 'e1'.

Figure 3:
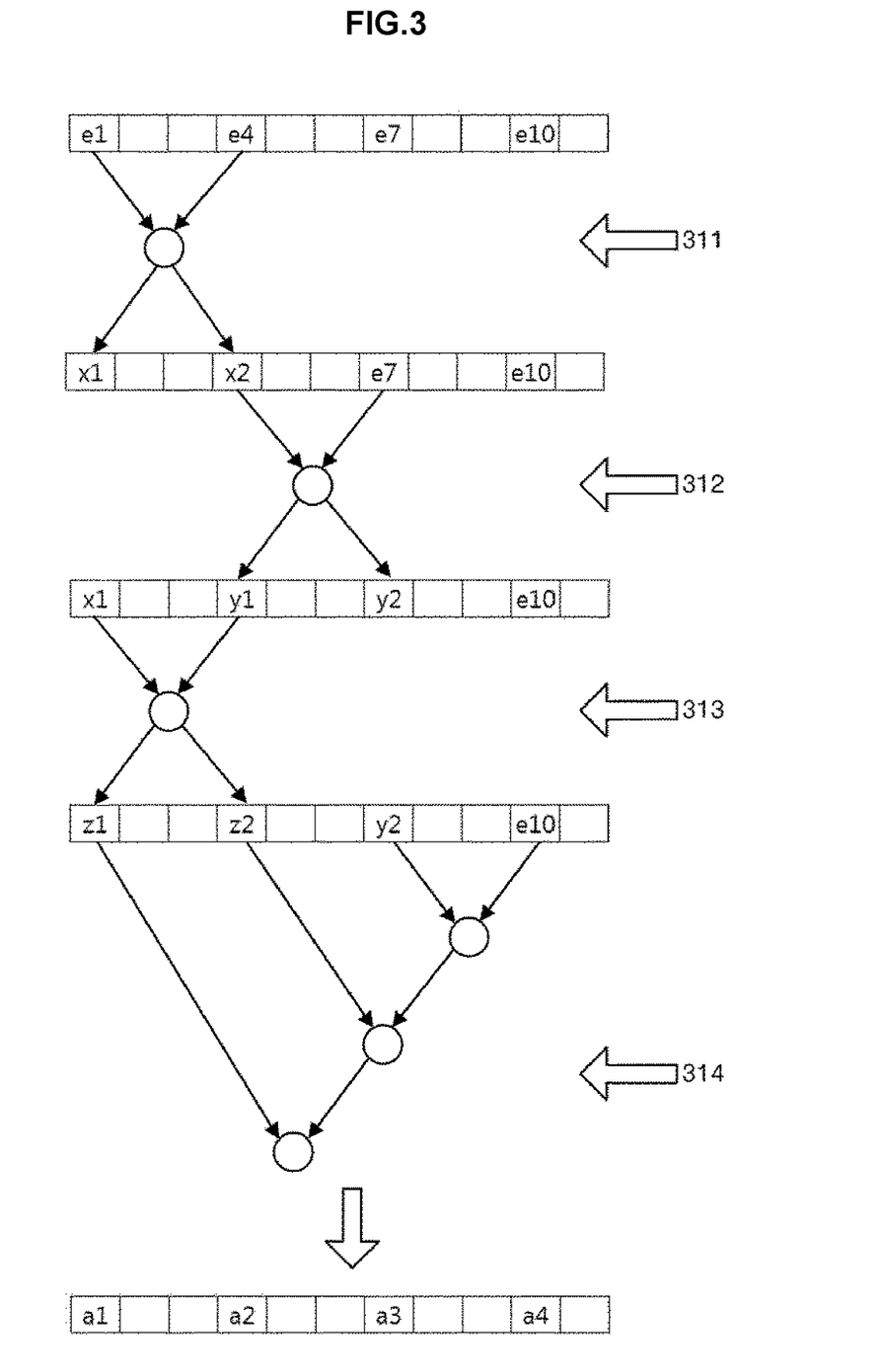

Therefore, when a result value calculated by applying 'e4' and 'e1' to the first homomorphic operation equation as the inputs is 'x2' and a result value calculated by applying 'e4' and 'e1' to the second homomorphic operation equation as the inputs is 'x1', the partial list sorting unit 115 may complete the insertion sorting based on 'e4' by inputting 'x2' into a place where 'e1' is located and inputting 'x2' into a place where 'e4' is located on partial list 1 221 as in a figure shown in reference numeral 311 of FIG. 3.

As described above, when the insertion sorting based on 'e4' is completed in partial list 1 221, partial list 1 221 is changed to the form of 'x1, x2, e7, e10'. Thereafter, the partial list sorting unit 115 may perform the insertion sorting based on 'e7' in partial list 1 221. In this case, since there are 'x2' and x'1' on the front end of 'e7' in partial list 1 221, the partial list sorting unit 115 performs the insertion sorting by a method of sequentially comparing 'x2' and 'x1' based on 'e7'.

To this end, the partial list sorting unit 115 first applies 'e7' and 'x2' to the first homomorphic operation equation and the second homomorphic operation equation as the inputs, respectively to calculate the result value and then locate the result value on partial list 1 221 by the same method as the method in 'e4', thereby processing the result value to be sorted in ascending order for the sizes of original numbers corresponding to 'e7' and 'x2'. That is, the partial list sorting unit 115 may perform the insertion sorting for 'e7' and 'x2' as in a figure shown in reference numeral 312 of FIG. 3. If partial list 1 221 in which sorting is performed based on 'e7' and 'x2' is changed to 'x1, y1, y2, and e10', the partial list sorting unit 115 may complete the insertion sorting based on 'e7' by additionally performing sorting based on the operation results of the first homomorphic operation equation and the second homomorphic operation equation for 'y1' and 'x1' based on as in a figure shown in reference numeral 313 of FIG. 3.

As described above, when the insertion sorting based on 'e7' is completed, the partial list sorting unit 115 may perform the insertion sorting based on 'e10' which exists last in partial list 1 221. If partial list 1 221 after completing the insertion sorting based on 'e7' is 'z1, z2, y2, and e10', the partial list sorting unit 115 may also finish the insertion sorting based on 'e10' by repeatedly performing a sorting process based on the first homomorphic operation equation and the second homomorphic operation equation for 'y2', 'z2', and 'z1' located on the front end of 'e10' in partial list 1 221 in sequence based on 'e10' by the same method as the insertion sorting based on 'e7' above in order to perform the insertion sorting based on 'e10'. That is, the partial list sorting unit 115 may complete the insertion sorting based on 'e10' by repeatedly performing the sorting process based on the first homomorphic operation equation and the second homomorphic operation equation for 'y2', 'z2', and 'z1' in sequence based on 'e10' as in a figure shown in reference numeral 314 of FIG. 3.

By such a method, the partial list sorting unit 115 may complete all insertion sorting for partial list 1 221, and when the insertion sorting is completed as described above, partial list 1 221 may be changed to new partial list 1 231 of 'a1, a2, a3, and a4' as in reference numeral 231. Since in new partial list 1 231, each encryption number on the partial list is insertion-sorted based on the first homomorphic operation equation and the second homomorphic operation equation, a partial list in the plaintext domain corresponding to new partial list 1 231 may be represented by '1, 4, 9, and 10'. That is, the partial list of '1, 4, 9, 10' is a form in which '10, 4, 1, 9' which is the partial list in the plaintext domain corresponding to partial list 1 221 is insertion-sorted.

When the insertion sorting is completed for partial list 1 221, the partial list sorting unit 115 also perform the insertion sorting based on the first homomorphic operation equation and the second homomorphic operation equation for each of remaining partial list 2 222 and partial list 3 223 in the same method as in partial list 1 221 to generate new partial list 2 232 and new partial list 3 233 like reference numerals 232 and 233.

In this case, since each of the new partial lists 231, 232, and 233 is insertion-sorted based on the size of the original number corresponding thereto, each of the partial lists in the plaintext domain corresponding to each of the new partial lists 231, 232, and 233 has a form in which the partial list is insertion-sorted according to the size of the original number as shown in a 'corresponding original array' illustrated at the right side in FIG. 2.

If there is a situation in which the length of the partial list is large in a process in which the partial list sorting unit 115 insertion-sorts each of the partial lists 221, 222, and 223, the insertion sorting based on the first homomorphic operation equation and the second homomorphic operation equation should be sequentially performed up to an encryption number located on a frontmost end starting from a point where the encryption number is located on the partial list in relation to insertion sorting based on the encryption number located on the rear end of each partial list, and as a result, a lot of time may be required.

For example, if the length of partial list 1 221 is very large like '400' other than '4' as illustrated in FIG. 2, the partial list sorting unit 115 should perform a operation for performing the insertion based on each encryption number which exists in partial list 1 221 multiple times Moreover, since an insertion-sorting process in the partial list for the shell sorting should be performed even for each gap constituting the gap sequence, the number of operation times may increase exponentially.

Therefore, according to an exemplary embodiment of the present invention, the window determining unit 117 may determine the length of the window in which the insertion sorting is to be performed in each partial list based on the lengths of the partial lists 221, 222, and 223 according to the operation in Equation 3 above.

In this regard, when a constant α is '0.7' in Equation 3 above, the length of partial list 1 221 is '4' in the exemplary embodiment of FIG. 2, and as a result, a window length k in partial list 1 221 may become '2' according to the operation in Equation 3 above.

When the window length is determined as described above, the insertion sorting processing unit 118 may perform the insertion sorting only for a partial array corresponding to '2' which is the window length at the time of performing the insertion sorting based on each of 'e4, e7, and e10' in partial list 1 221.

That is, the insertion sorting may be performed for 'e4' up to a first place (a place where e1 is located) which is a partial array as large as '2' based on 'e4' among four places constituting partial list 1 221, the insertion sorting may be performed for 'e7' up to a second place (a place where e4 is located) and a first place (a place where e1 is located) which are partial arrays as large as '2' based on 'e7' among four places constituting partial list 1 221, and the insertion sorting may be performed for 'e10' only up to a third place (a place where e7 is located) and a second place (a place where e4 is located) which are partial arrays as large as '2' based on 'e10' among four places constituting partial list 1 221.

That is, when the insertion sorting is performed for 'e10', the insertion sorting should be performed through a sequential comparison of encryption numbers of the third place (the place where e7 is located), the second place (the place where e4 is located), and the first place (the place where e1 is located) among four places constituting partial list 1 221 in principle, and in the present invention, the insertion sorting is performed through a sequential comparison only with encryption numbers of the third place (the place where e7 is located) and the second place (the place where e4 is located) which is a partial array as large as '2' which is the window length among four places constituting partial list 1 221.

By such a method, the window determining unit 117 determines the window length for each of the partial lists 221, 222, and 223, and when the insertion sorting processing unit 118 performs the insertion sorting in each of the partial lists 221, 222, and 223, the insertion sorting processing unit 118 may reduce the number of operation times by performing the insertion sorting only for the partial array corresponding to the window length based on an encryption number which becomes a target of the insertion sorting.

When new partial lists 231, 232, and 233 are generated in which insertion sorting is completed through the partial list sorting unit 115, the sorting completion processing unit 116 may complete the shell sorting for '3' which is the first gap by generating an array 'a1, a5, a9, a2, a6, a10, a3, a7, a11, a4, and a8' (240) as in a figure shown in reference numeral 240 by combining the partial lists 231, 232, and 233.

In this case, since the array 'a1, a5, a9, a2, a6, a10, a3, a7, a11, a4, and a8' (240) is a result of performing the shell sorting when the gap is '3' based on each number size of '10, 7, 5, 4, 2, 3, 1, 6, 8, 9, and 11' which is the original array, when 'a1, a5, a9, a2, a6, a10, a3, a7, a11, a4, and a8' (240) is decrypted, a result '1, 2, 3, 4, 6, 5, 9, 7, 8, 10, and 11' which is a shell sorting result is calculated while the gap is '3' for '10, 7, 5, 4, 2, 3, 1, 6, 8, 9, and 11'.

Thus, when the shell sorting for the case where the gap is '3' is completed, the shell sorting performing unit 113 may perform the shell sorting by using a gap of a next sequence constituting the gap sequence and consecutively perform the shell sorting in descending order for the gaps constituting the gaps to complete final sorting for the array stored in the encryption data storage unit 111.

Figure 4:
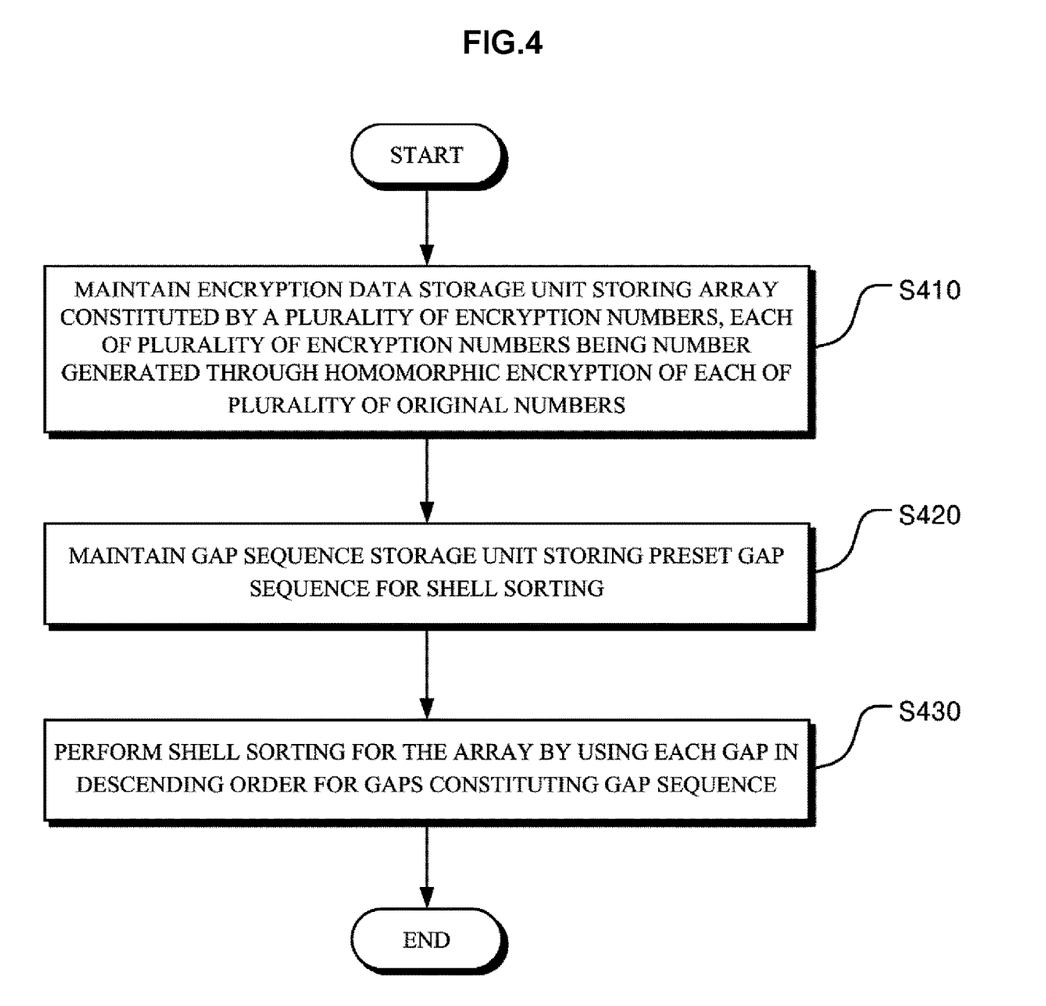
FIG. 4 is a flowchart showing an operating method of an electronic device for sorting homomorphic ciphertext using shell sorting according to an exemplary embodiment of the present invention.

FIG. 4 is a flowchart showing an operating method of an electronic device for sorting homomorphic ciphertext using shell sorting according to an exemplary embodiment of the present invention.

In step S410, an encryption data storage unit is maintained, which stores an array constituted by a plurality of encryption numbers (each of the plurality of encryption numbers is a number generated through homomorphic encryption of each of a plurality of original numbers).

In step S420, a gap sequence storage unit is maintained, which stores a preset gap sequence for shell sorting.

In step S430, the shell sorting for the array is performed by using each gap in descending order for gaps constituting the gap sequence.

In this case, step S430 includes, when the shell sorting for the array is performed by using an n (n is a natural number)-th gap among the gaps constituting the gap sequence, a step of generating partial lists according to the n-th gap from the array (when n is 1, the array stored in the encryption data storage unit in an initial state is used) in which shell sorting is completed by using an n−1-th gap, a step of performing sorting for the partial lists by performing insertion sorting based on sizes of original numbers corresponding to encryption numbers constituting each partial list for each of the partial lists, and a step of generating the array in which shell sorting is completed by using the n-th gap by combining the partial lists in which sorting is completed when sorting the partial lists is completed.

In this case, according to an exemplary embodiment of the present invention, in the step of sorting the partial lists, in order to perform the insertion sorting for each of the partial lists, when insertion sorting through a comparison between a first encryption number and a second encryption number which are any two encryption numbers in each partial list is performed, the insertion sorting between the first encryption number and the second encryption number is processed by a method of calculating a third encryption number by performing an operation by applying the first encryption number and the second encryption number to a predetermined first homomorphic operation equation corresponding to a first operation equation for calculating a maximum value between a first original number corresponding to the first encryption number and a second original number corresponding to the second encryption number, calculating a fourth encryption number by performing the operation by applying the first encryption number and the second encryption number to a predetermined second homomorphic operation equation corresponding to a second operation equation for calculating a minimum value between the first original number and the second original number, and then inputting the fourth encryption number into a place where the first encryption number is located on the partial list and inputting the third encryption number into a place where the second encryption number is located on the partial list to perform the insertion sorting for each of the partial lists.

In this case, according to an exemplary embodiment of the present invention, the first homomorphic operation equation may be an operation equation expressed by Equation 1 above and the second homomorphic operation equation may be an operation equation expressed by Equation 2 above.

According to an exemplary embodiment of the present invention, the step of sorting the partial lists may include a step of determining a window length in which insertion sorting is to be performed based on a length of each of the partial lists, and a step of performing insertion sorting only for a partial array corresponding to the window length based on an encryption number which becomes a target of the insertion sorting when performing the insertion sorting in each of the partial lists.

In this case, according to an embodiment of the present invention, in the step of determining the window length, the window length may be determined based on Equation 3 above.

Hereinabove, the operating method of the electronic device for sorting homomorphic ciphertext using shell sorting according to an exemplary embodiment of the present invention has been described with reference to FIG. 4. Herein, since the operating method of the electronic device for sorting homomorphic ciphertext using shell sorting according to an exemplary embodiment of the present invention may correspond to the configuration for the operation of the electronic device 110 for sorting homomorphic ciphertext using shell sorting described by using FIGS. 1 to 3, a more detailed description thereof will be omitted.

The operating method of the electronic device for sorting homomorphic ciphertext using shell sorting according to an exemplary embodiment of the present invention may be implemented by a computer program stored in a storage medium for executing the computer program through coupling with a computer.

The operating method of the electronic device for sorting homomorphic ciphertext using shell sorting according to an exemplary embodiment of the present invention may be implemented in a program command type which may be performed through various computer means and recorded in a computer readable medium. The computer readable medium may include singly or combinationally a program command, a data file, or a data structure or a combination thereof. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. An electronic device for sorting homomorphic ciphertext using shell sorting, comprising:
an encryption data storage unit storing an array constituted by a plurality of encryption numbers, each of the plurality of encryption numbers being a number generated through homomorphic encryption of each of a plurality of original numbers;
a gap sequence storage unit storing a preset gap sequence for shell sorting; and
a shell sorting performing unit performing the shell sorting for the array by using each gap in descending order for the gaps constituting the gap sequence,
wherein the shell sorting performing unit includes
a partial list generating unit generating, when performing the shell sorting for the array by using an n (n is a natural number)-th gap among the gaps constituting the gap sequence, a partial list according to the n-th gap from the array in which the shell sorting is completed by using an n−1-th gap, when n is 1, the array stored in the encryption data storage unit in an initial state being used,
a partial list sorting unit sorting the partial lists by performing insertion sorting of each of the partial lists based on sizes of original numbers corresponding to encryption numbers constituting each partial list, and
a sorting completion processing unit combining, when sorting the partial lists is completed, the partial lists of which sorting is completed to generate the array in which the shell sorting is completed using the n-th gap.

2. The electronic device of claim 1, wherein in order to perform the insertion sorting for each of the partial lists, when insertion sorting through a comparison between a first encryption number and a second encryption number which are any two encryption numbers in each partial list is performed, the partial list sorting unit processes the insertion sorting between the first encryption number and the second encryption number by a method of calculating a third encryption number by performing an operation by applying the first encryption number and the second encryption number to a predetermined first homomorphic operation equation corresponding to a first operation equation for calculating a maximum value between a first original number corresponding to the first encryption number and a second original number corresponding to the second encryption number, calculating a fourth encryption number by performing the operation by applying the first encryption number and the second encryption number to a predetermined second homomorphic operation corresponding to a second operation equation for calculating a minimum value between the first original number and the second original number, and then inputting the fourth encryption number into a position where the first encryption number is located and inputting the third encryption number into a position where the second encryption number is located on the partial list to perform the insertion sorting for each of the partial lists.

3. The electronic device of claim 2, wherein the first homomorphic operation equation is an operation equation expressed by Equation 1 below and the second homomorphic operation equation is an operation equation expressed by Equation 2 below:

$$MAX = \{0.5 \otimes (a \oplus b)\} \oplus \{0.5 \otimes \sqrt{(a \ominus b)^2}\} \quad \text{[Equation 1]}$$

$$MIN = a \oplus b \ominus MAX \quad \text{[Equation 2]}$$

Here, $\otimes$ denotes an equation corresponding to a multiplication in a plaintext domain as a homomorphic multiplication performed in an encryption domain, $\oplus$ denotes an equation corresponding to an addition in the plaintext domain as a homomorphic addition performed in the encryption domain, and $\ominus$ denotes an equation corresponding to a subtraction in the plaintext domain as a homomorphic subtraction performed in the encryption domain.

4. The electronic device of claim 1, wherein the partial list sorting unit includes
a window determining unit determining a window length to be insertion-sorted based on a length of each of the partial lists, and
an insertion sorting processing unit performing the insertion sorting only for a partial array corresponding to the window length based on an encryption number which becomes a target of the insertion sorting when performing the insertion sorting in each of the partial lists.

5. The electronic device of claim 4, wherein the window determining unit determines the window length based on Equation 3 below:

$$k = \min(\lceil \sqrt{l_S \cdot \alpha} \rceil, l_S) \quad \text{[Equation 3]}$$

Here, k denotes the window length, $l_S$ denotes the length of each partial list, and $\alpha$ denotes a preset constant.

6. An operating method of an electronic device for sorting homomorphic ciphertext using shell sorting, comprising:
maintaining an encryption data storage unit storing an array constituted by a plurality of encryption numbers, each of the plurality of encryption numbers being a number generated through homomorphic encryption of each of a plurality of original numbers;
maintaining a gap sequence storage unit storing a preset gap sequence for shell sorting; and
performing the shell sorting for the array by using each gap in descending order for the gaps constituting the gap sequence,
wherein the performing of the shell sorting includes
generating, when performing the shell sorting for the array by using an n (n is a natural number)-th gap among the gaps constituting the gap sequence, a partial list according to the n-th gap from the array in which the shell sorting is completed by using an n−1-th gap, when n is 1, the array stored in the encryption data storage unit in an initial state being used,
sorting the partial lists by performing insertion sorting of each of the partial lists based on sizes of original numbers corresponding to encryption numbers constituting each partial list, and
combining, when sorting the partial lists is completed, the partial lists of which sorting is completed to generate the array in which the shell sorting is completed using the n-th gap.

7. The operating method of claim 6, wherein in the sorting of the partial lists, in order to perform the insertion sorting for each of the partial lists, when insertion sorting through a comparison between a first encryption number and a second encryption number which are any two encryption numbers in each partial list is performed, the insertion sorting between the first encryption number and the second encryption number is processed by a method of calculating a third encryption number by performing an operation by applying the first encryption number and the second encryption number to a predetermined first homomorphic operation equation corresponding to a first operation equation for calculating a maximum value between a first original number corresponding to the first encryption number and a second original number corresponding to the second encryption number, calculating a fourth encryption number by performing the operation by applying the first encryption number and the second encryption number to a predetermined second homomorphic operation corresponding to a second operation equation for calculating a minimum value between the first original number and the second original number, and then inputting the fourth encryption number into a position where the first encryption number is located and inputting the third encryption number into a position where the second encryption number is located on the partial list to perform the insertion sorting for each of the partial lists.

8. The operating method of claim 7, wherein the first homomorphic operation equation is an operation equation expressed by Equation 1 below and the second homomorphic operation equation is an operation equation expressed by Equation 2 below:

$$MAX = \{0.5 \otimes (a \oplus b)\} \oplus \{0.5 \otimes \sqrt{(a \ominus b)^2}\} \quad \text{[Equation 1]}$$

$$MIN = a \oplus b \ominus MAX \quad \text{[Equation 2]}$$

Here, $\otimes$ denotes an equation corresponding to a multiplication in a plaintext domain as a homomorphic multiplication performed in an encryption domain, $\oplus$ denotes an equation corresponding to an addition in the plaintext domain as a homomorphic addition performed in the encryption domain, and $\ominus$ denotes an equation corresponding to a subtraction in the plaintext domain as a homomorphic subtraction performed in the encryption domain.

9. The operating method of claim 6, wherein the sorting of the partial lists includes
determining a window length to be insertion-sorted based on a length of each of the partial lists, and
performing the insertion sorting only for a partial array corresponding to the window length based on an encryption number which becomes a target of the insertion sorting when performing the insertion sorting in each of the partial lists.

10. The operating method of claim 9, wherein in the determining of the window length, the window length is determined based on Equation 3 below:

$$k = \min(\lceil \sqrt{l_S \cdot \alpha} \rceil, l_S) \quad \text{[Equation 3]}$$

Here, k denotes the window length, $l_S$ denotes the length of each partial list, and $\alpha$ denotes a preset constant.

11. A non-transitory computer readable recording medium having a program recorded therein for allowing a computer to execute an operating method of an electronic device for sorting homomorphic ciphertext using shell sorting, comprising:

maintaining an encryption data storage unit storing an array constituted by a plurality of encryption numbers, each of the plurality of encryption numbers being a number generated through homomorphic encryption of each of a plurality of original numbers;

maintaining a gap sequence storage unit storing a preset gap sequence for shell sorting; and performing the shell sorting for the array by using each gap in descending order for the gaps constituting the gap sequence, wherein the performing of the shell sorting includes generating, when performing the shell sorting for the array by using an n (n is a natural number)-th gap among the gaps constituting the gap sequence, a partial list according to the n-th gap from the array in which the shell sorting is completed by using an n−1-th gap, when n is 1, the array stored in the encryption data storage unit in an initial state being used, sorting the partial lists by performing insertion sorting of each of the partial lists based on sizes of original numbers corresponding to encryption numbers constituting each partial list, and combining, when sorting the partial lists is completed, the partial lists of which sorting is completed to generate the array in which the shell sorting is completed using the n-th gap.

* * * * *